(12) United States Patent
Abouraddy et al.

(10) Patent No.: US 9,512,036 B2
(45) Date of Patent: Dec. 6, 2016

(54) IN-FIBER PARTICLE GENERATION

(71) Applicants: Massachusetts Institute of Technology, Cambridge, MA (US); University of Central Florida Research Foundation, Inc., Orlando, FL (US)

(72) Inventors: Ayman F. Abouraddy, Oviedo, FL (US); Esmaeil H. Banaei, Orlando, FL (US); Daosheng S. Deng, Cambridge, MA (US); Yoel Fink, Brookline, MA (US); Steven G. Johnson, Arlington, MA (US); Joshua J. Kaufman, Oviedo, FL (US); Xiangdong Liang, Cambridge, MA (US); Soroush Shabahang, Orlando, FL (US); Guangming Tao, Orlando, FL (US)

(73) Assignees: Massachusetts Institute of Technology, Cambridge, MA (US); University of Central Florida Research Foundation, Inc., Orlando, FL (US)

( * ) Notice: Subject to any disclaimer, the term of this patent is extended or adjusted under 35 U.S.C. 154(b) by 513 days.

(21) Appl. No.: 13/803,213

(22) Filed: Mar. 14, 2013

(65) Prior Publication Data
US 2013/0202888 A1 Aug. 8, 2013

Related U.S. Application Data

(63) Continuation-in-part of application No. PCT/US2011/057895, filed on Oct. 26, 2011.
(Continued)

(51) Int. Cl.
*D02J 1/22* (2006.01)
*D01D 5/00* (2006.01)
(Continued)

(52) U.S. Cl.
CPC .................. *C03C 25/26* (2013.01); *B01J 2/00* (2013.01); *B29B 9/00* (2013.01); *B29B 9/06* (2013.01);
(Continued)

(58) Field of Classification Search
None
See application file for complete search history.

(56) References Cited

U.S. PATENT DOCUMENTS

| 5,907,652 A | 5/1999 | DiGiovanni et al. |
| 6,248,696 B1 | 6/2001 | Tuominen et al. |

(Continued)

FOREIGN PATENT DOCUMENTS

| JP | 08124438 A | 5/1996 |
| JP | 2001235609 A | 8/2001 |

(Continued)

OTHER PUBLICATIONS

Deng et al, In-Fiber Semiconductor Filament Arrays, 2008, Nano Letters, vol. 8, No. 12, pp. 4265-4269.*
(Continued)

*Primary Examiner* — Mary F Theisen
(74) *Attorney, Agent, or Firm* — Theresa A. Lober

(57) ABSTRACT

A fiber is provided, including a cladding material that is disposed along a longitudinal-axis fiber length. A plurality of spherical particles are disposed as a sequence along a longitudinal line parallel to the longitudinal fiber axis in at least a portion of the fiber length, and include a spherical particle material that is interior to the fiber cladding material and different than the fiber cladding material. To produce particles, a drawn fiber, having a longitudinal-axis fiber length and including at least one fiber core that has a longitudinal core axis parallel to the longitudinal fiber axis and that is internally disposed to at least one outer fiber
(Continued)

cladding layer along the fiber length, is heated for a time that is sufficient to cause a fiber core to break-up into droplets sequentially disposed along the fiber core axis. Fiber cooling solidifies droplets into spherical particles interior to fiber cladding.

25 Claims, 8 Drawing Sheets

Related U.S. Application Data

(60) Provisional application No. 61/663,032, filed on Jun. 22, 2012, provisional application No. 61/406,872, filed on Oct. 26, 2010.

(51) Int. Cl.
| | |
|---|---|
| B01J 2/00 | (2006.01) |
| C03C 25/26 | (2006.01) |
| B29B 9/00 | (2006.01) |
| D02G 3/22 | (2006.01) |
| D02G 3/04 | (2006.01) |
| B29B 9/06 | (2006.01) |
| B29C 47/04 | (2006.01) |
| B29C 47/92 | (2006.01) |
| C03C 25/00 | (2006.01) |
| C03B 37/15 | (2006.01) |
| C03B 19/10 | (2006.01) |
| C03C 14/00 | (2006.01) |
| B29C 47/00 | (2006.01) |
| B29C 47/02 | (2006.01) |

(52) U.S. Cl.
CPC ........... *B29C 47/0014* (2013.01); *B29C 47/04* (2013.01); *B29C 47/92* (2013.01); *C03B 19/1005* (2013.01); *C03B 37/15* (2013.01); *C03C 14/00* (2013.01); *C03C 14/006* (2013.01); *C03C 25/002* (2013.01); *D01D 5/00* (2013.01); *D02G 3/045* (2013.01); *D02G 3/22* (2013.01); *B29C 47/0066* (2013.01); *B29C 47/027* (2013.01); *B29C 2947/92704* (2013.01); *C03B 2201/86* (2013.01); *D02J 1/22* (2013.01); *D02J 1/224* (2013.01); *Y10T 428/2927* (2015.01)

(56) References Cited

U.S. PATENT DOCUMENTS

| | | | |
|---|---|---|---|
| 6,374,641 | B1 | 4/2002 | Chu et al. |
| 6,550,279 | B1 | 4/2003 | Anderson et al. |
| 6,645,893 | B2 | 11/2003 | Miura et al. |
| 6,723,435 | B1 | 4/2004 | Horne et al. |
| 7,485,799 | B2 | 2/2009 | Guerra |
| 7,842,880 | B2 | 11/2010 | Gazda |
| 7,935,418 | B2 | 5/2011 | Koops et al. |
| 8,404,174 | B2 | 3/2013 | Nakanishi et al. |
| 9,263,614 | B2 | 2/2016 | Deng et al. |
| 2003/0026584 | A1 | 2/2003 | Ingman et al. |
| 2003/0232200 | A1 | 12/2003 | Bryan et al. |
| 2005/0019504 | A1 | 1/2005 | Bi et al. |
| 2007/0131266 | A1 | 6/2007 | Dutta |
| 2007/0246713 | A1 | 10/2007 | Arnold et al. |
| 2009/0087899 | A1 | 4/2009 | McKnight et al. |
| 2011/0098383 | A1 | 4/2011 | Albert et al. |
| 2012/0100374 | A1 | 4/2012 | Zinn et al. |
| 2012/0267820 | A1* | 10/2012 | Orf .................. D02J 1/224 264/176.1 |
| 2014/0272411 | A1 | 9/2014 | Gumennik et al. |
| 2015/0044463 | A1 | 2/2015 | Fink et al. |
| 2016/0060166 | A1 | 3/2016 | Abouraddy et al. |

FOREIGN PATENT DOCUMENTS

| | | |
|---|---|---|
| JP | 2002104842 A | 4/2002 |
| JP | 2004 44035 A1 | 2/2004 |
| JP | 2009 133037 A | 6/2009 |
| JP | 2010119970 A | 6/2010 |
| WO | 200015548 A2 | 3/2000 |
| WO | 2004003268 A1 | 1/2004 |

OTHER PUBLICATIONS

Zhang et al, Mass-Productions of Verticxally Aligned Extremely Long Metallic Micro/Nanowires Using Fiber Drawing Nanomanufacturing, 2008, Advanced Materials, 20, pp. 1310-1314.*
PCT/US2011/057895, International Search Report, Form PCT/ISA/210 First sheet, Second sheet, and patent family annex, May 2012.
PCT/US2011/057895, Written Opinion of the International Searching Authority, Form PCT/ISA/237 cover Sheet, Box I sheet, Box V sheet, and Box V Sheet, May 2012.
Tao et al., "Multimaterial Fibers," International Journal of Applied Glass Science, vol. 3, No. 4, pp. 349-368, Nov. 2012.
Shabahang et al., "Observation of the Plateau-Rayleight capillary instability in multi-material optical fibers," Applied Physics Letters, vol. 99, No. 16, pp. 161909-1-161909-3, Oct. 21, 2011.
Kaufman et al., "Thermal Drawing of High-Density Macroscopic Arrays of Well-Ordered Sub-5-nm-Diameter Nanowires," Nano Letters, vol. 11, pp. 4768-4773, Oct. 3, 2011.
Orf et al., "Fiber draw synthesis," PNAS, vol. 108, No. 12, pp. 4743-4747, Mar. 2011.
Deng et al., "In-Fiber Semiconductor Filament Arrays," NANO Letters, vol. 8, No. 12, pp. 4265-4269, Oct. 2008.
Deng et al., "Processing and properties of centimeter-long, in-fiber, crystalline-selenium filaments," Applied Physics Letters, vol. 96, pp. 023102-1-023102-3, Jan. 2010.
Deng et al., "Exploration of in-fiber nanostructures from capillary instability," Optics Express, vol. 19, No. 17, pp. 16273-16290, Aug. 2011.
Kaufman et al., "Structured spheres generated by an in-fibre fluid instability," Nature, vol. 487, No. 7408, pp. 463-467, Erratum p. 1, Jul. 2012.
Kaufman et al., "In-fiber fabrication of size-controllable structured particles," CLEO: Science and Innovations 2012, conference on Lasers and Electro-Optics,Technical Digest, CM4L.6 pp. 1-2, San Jose, CA, May 2012.
Liang et al., "Linear stability analysis of capillary instabilities for concentric cylindrical shells," J. Fluid Mech., vol. 683, pp. 235-262, Aug. 2011.
Shabahang et al., "Scalable fabrication of micro- and nano-particles utilizing the Rayleigh instability in multi-material fibers," Micro- and Nanotechnology Sensors, Systems, and Applications III, Proc. of SPIE vol. 8031, pp. 80132O-1-30132O-7, May 2011.
PCT/US2013/046694, International Search Report, Form PCT/ISA/210 First sheet, Continuation of first sheet (2), Second sheet, and further information continued from PCT/ISA/210, Apr. 2015.
PCT/US2013/046694, Written Opinion of the International Searching Authority, Form PCT/ISA/237 cover Sheet, Box I sheet, Box III sheet, Box IV and Box V sheet, and Separate Sheet, sheets 1-3, Apr. 2015.
PCT/US2014/26902, International Search Report, Form PCT/ISA/210 First sheet, Continuation of first sheet (2)-(3), Second sheet, and extra sheet, Jan. 2015.
PCT/US2014/26902, Written Opinion of the International Searching Authority, Form PCT/ISA/237 cover Sheet, Box I sheet, Box IV sheet, Box V sheet, and 5 Supplemental Box sheets, Jan. 2015.
PCT/US2014/26867, International Search Report, Form PCT/ISA/210 First sheet, Continuation of first sheet (2), Second sheet, continuation of second sheet, and extra sheet, Sep. 2014.
PCT/US2014/26867, Written Opinion of the International Searching Authority, Form PCT/ISA/237 cover Sheet, Box I sheet, Box IV sheet, Box V sheet, Box VII sheet, and 9 Supplemental Box sheets, Sep. 2014.

(56) References Cited

OTHER PUBLICATIONS

Abouraddy, "Multi-Material fibers: Prospects for photonics, energy, and biotechnology," Presentation at the MSE Seminar Colloquium Series, Division of Materials Science and Engineering, Boston University, Slides 1-69, Boston, MA Feb. 22, 2013.
Abouraddy et al., "Using in-fiber fluid instabilities for the scalable production of structured spherical particles," Presentation at 65th Annual Meeting of the APS Division of Fluid Dynamics, Slides 1-11, San Diego, CA, Nov. 18-20, 2012.
Yang et al., "Fabrication of chalcogenide microspheres," PNCS International Conference on the Physics of Noncrystalline Solids (XIII PNCS), Staff Poster Abstracts p. 94, Hubei, CN, Sep. 16-20, 2012.
Japanese Patent Appl. No. 2013-536781, Summary of JP Office Action, pp. 1-4, Oct. 2014.
Japanese Patent Appl. No. 2013-536781, Response to JP Office Action, Jan. 2015.
Japanese Patent Appl. No. 2013-536781, JP Office Action, Aug. 2015.
Japanese Patent Appl. No. 2013-536781, Response to JP Office Action, Sep. 2015.
Shabahang et al., "Observation of the Rayleight-Plateau Instability in the Core of a Multi-Material Optical Fiber During Tapering," Presentation at OSA FiO, Slides 1-18, Rochester, NY, Oct. 16-20, 2010.
Kaufman et al., "Polymer Fibers for Nano-Particle Fabrication and Solar Energy Capture," Presentation at Workshop on Next-Generation Optical Fiber Technology, Slides 1-5, Cocoa Beach, FL, Oct. 18, 2010.
Abouraddy, "Surprises in the Fabrication of Multi-Material Fibers," Presentation at Workshop on Next-Generation Optical Fiber Technology, Slides 1-33, Cocoa Beach, FL, Oct. 18, 2010.
Abouraddy, "Surprises in the Fabrication of Multi-Material Fibers," Presentation at the Center for Optical Materials Science and Engineering Technologies (COMSET), Clemson University, Slides 1-67, Nov. 3, 2011.
Abouraddy, "Multi-Material Optical Fibers: Fabrication and Applications," Presentation at SPIE Defense, Security, and Sensing Conference 2011, Slides 1-50, Apr. 25-29, 2011.
Shabahang et al., "Scalable fabrication of micro- and nano-particles utilizing the Rayleigh instability in multi-material Fibers," Presentation at SPIE Defense, Security, and Sensing Conference 2011, Slides 1-10, Apr. 25-29, 2011.
Kaufman et al., "Scalable fabrication of micro- and nano-particles utilizing the Rayleigh instability in multi-material Fibers," Presentation at TechConnect World, Nanotech 2011, slides 1-10, Boston, MA, Jun. 13-16, 2011.
Yang et al, "Fabrication of chalcogenide microspheres," Poster at 11th Annual Center for Ultrahigh Bandwidth Devices for Optical Systems (CUDOS) Workshop, New South Wales, AU, Jan. 31-Feb. 3, 2012.
Kaufman et al., "In-fiber fabrication of size-controllable structured particles," Presenatation at OSA Advanced Photonics Congress, Specialty Optical Fibers & Applications (SOF) Topical Meeting, Slides 1-26, Colorado Springs, CO, Jun. 17-21, 2012.

* cited by examiner

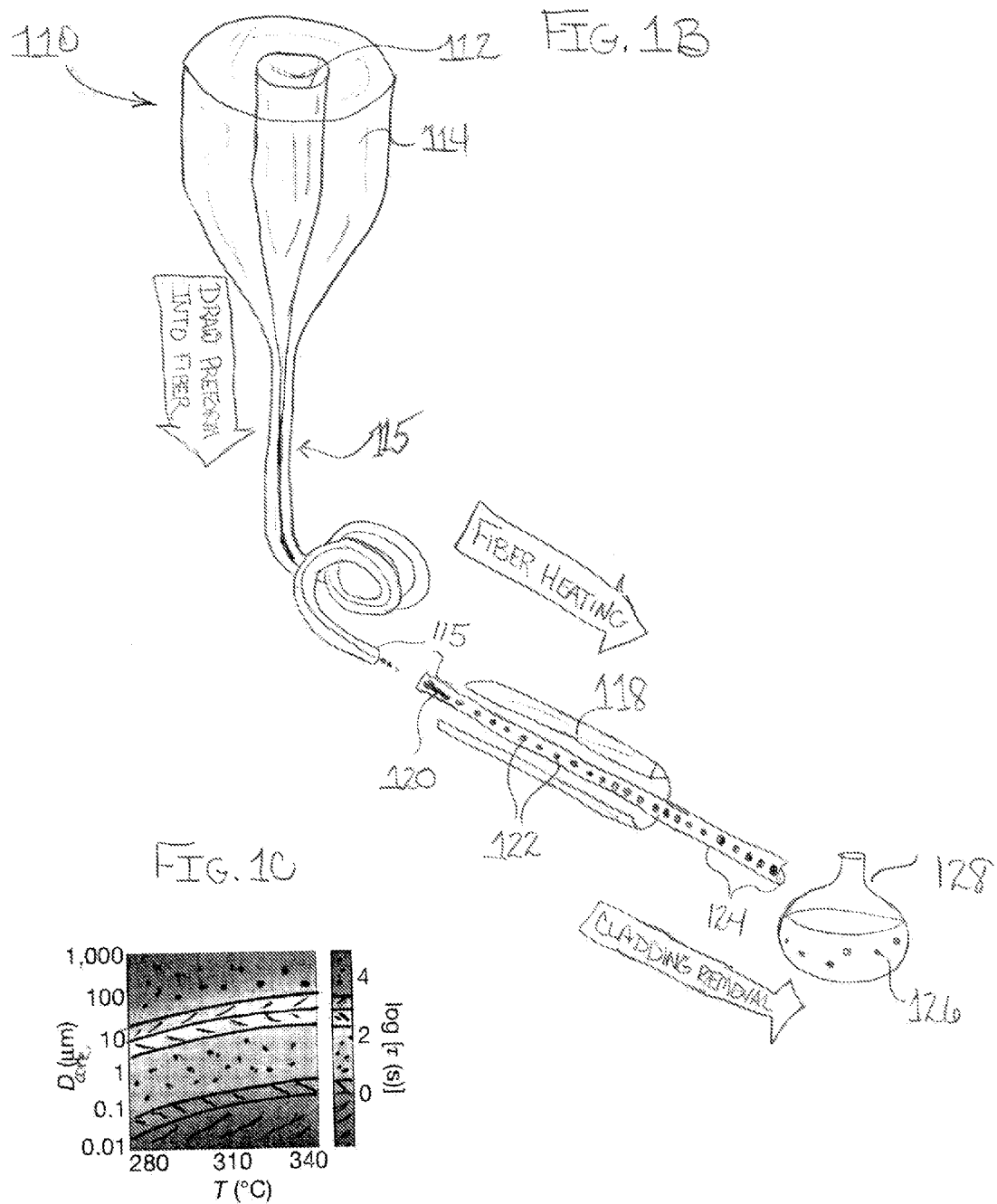

IN-FIBER PARTICLE GENERATION

CROSS-REFERENCE TO RELATED APPLICATIONS

This application is a continuation-in-part of International Application PCT/US2011/057895, filed Oct. 26, 2011. This application claims the benefit of U.S. Provisional Application No. 61/406,872, filed Oct. 26, 2010; and this application claims the benefit of U.S. Provisional Application No. 61/663,032, filed Jun. 22, 2012. The entirety of International Application PCT/US2011/057895, U.S. Provisional Application No. 61/406,872, and U.S. Provisional Application No. 61/663,032 are hereby incorporated by reference.

STATEMENT REGARDING FEDERALLY SPONSORED RESEARCH

This invention was made with Government support under Contract No. DMR-0819762, awarded by the National Science Foundation; under Contract No. ECCS-1002295, awarded by the National Science Foundation; and under Contract No. W911NF-07-D-0004, awarded by the Army Research Office. The Government has certain rights in the invention.

BACKGROUND

This invention relates generally to particle fabrication, and more particularly relates to generation of structured microparticles and nanoparticles.

Known so-called 'bottom-up' approaches for forming particles, such as nanoparticles, generally rely on nucleation, chemical reactions, or self-assembly processes. The particles produced using such approaches are typically characterized by a large dispersion in size and shape distributions, and are generally hampered by particle coalescence and agglomeration during particle growth. Conversely, so-called 'top-down' approaches, such as microfluidics, lithography, and imprint lithography, typically yield larger, mono-disperse particles, but each such approach is generally suited only to a specific material and particle size range that is determined by the underlying kinetics of the process.

SUMMARY

The many limitations of prior approaches for forming particles are overcome with a method for forming particles that employs a fiber. The fiber includes a cladding material that is disposed along a longitudinal-axis fiber length. A plurality of spherical particles are disposed as a sequence along a longitudinal line parallel to the longitudinal fiber axis in at least a portion of the fiber length. The particles include a spherical particle material that is interior to the fiber cladding material and that is different than the fiber cladding material. The particles can thereby be disposed as embedded particles in the cladding material, separated from one another, having a median size between 5 nm and 1 mm.

In one method for producing particles, there is provided a drawn fiber having a longitudinal-axis fiber length and including at least one fiber core that has a longitudinal core axis parallel to the longitudinal fiber axis. The fiber core is internally disposed to at least one outer fiber cladding layer along the fiber length. The fiber is heated at a heating temperature, T, for a heating time, t, that is sufficient to cause at least one fiber core to break-up into droplets that are sequentially disposed along the fiber core axis. The heated fiber is then cooled to solidify the droplets into spherical particles that are disposed along the fiber core axis over the fiber length, interior to the fiber cladding layer. The particles are disposed as a longitudinal sequence of spherical particles that is parallel to the longitudinal fiber axis.

This particle formation method enables the controllable and scalable production of complex and well-defined micro-scale and nano-scale structures that are well-ordered, controllably oriented, and immobilized. An enormous range of applications, e.g., from the fields of chemistry, physics, and biology, are addressed by the particle formation. For example, three-dimensional optical and acoustic meta-materials can be produced, optical-resonance-based sensitive detection of chemical species and pathogens can be enabled, and sophisticated controlled-release drug delivery systems can be realized. Many applications requiring precisely controlled particle formation can be enabled in a cost-effective and well-controlled environment. Other features and advantages will be apparent from the following description and accompanying figures, and from the claims.

BRIEF DESCRIPTION OF THE DRAWINGS

FIG. 1B is a schematic perspective view of materials being processed in the steps of the flow chart of FIG. 1A;

DETAILED DESCRIPTION

Figure 1A:
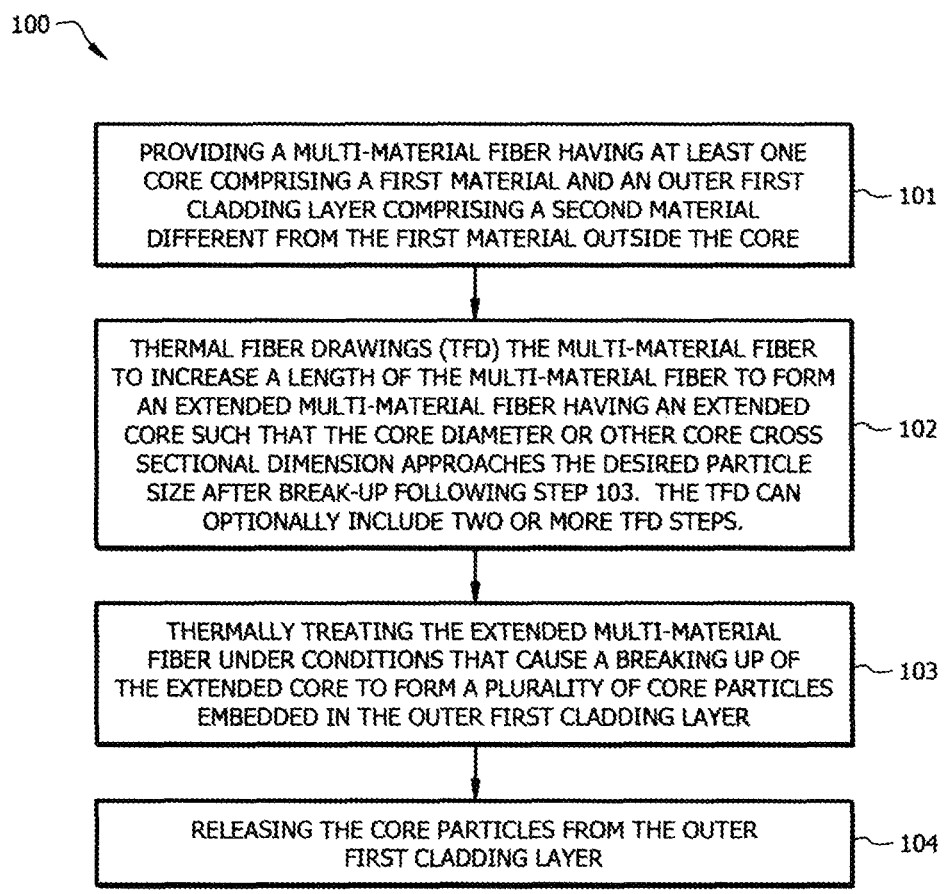
FIG. 1A is a flow chart that shows steps in an example method for the efficient and scalable fabrication of spherical particles such as spherical microparticles or nanoparticles, according to an example embodiment.

In this Description, referring to the attached figures, like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Description is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Disclosed embodiments include methods applied to multi-material fibers for the efficient and scalable fabrication of microparticles or nanoparticles. Disclosed methods include a thermally-based process applied to an extended multi-material fiber having an extended core, that results in the extended core breaking up into a plurality of microparticles or nanoparticles that are embedded in a cladding layer of the fiber.

FIG. 1A is a flow chart that shows steps in an example method 100 for the efficient and scalable in-fiber fabrication of microparticles or nanoparticles, according to an example embodiment. Step 101 comprises providing a multi-material fiber preform having at least one core comprising a first material and including at least an outer first cladding layer comprising a second material different from the first material outside the core. The first and second materials generally have similar softening temperatures that allow for the first and second materials to be consolidated together and then co-drawn from the same fiber preform, such as a softening temperature within 50° C. of one another. Step 101 can comprise assembling a multi-material macroscopic preform with a core assembled from the intended particle constituent materials encased in a scaffold material that provides a cladding material.

Step 102 comprises thermal drawing of the multi-material fiber preform to form an extended multi-material fiber having an extended core that is parallel to the longitudinal-axis length of the fiber, such that the core diameter (or other cross-sectional core dimension) in the extended core is reduced to approach the diameter of particles which are to be formed in a subsequent step with the core material or materials. To ensure the integrity of the fiber core, the fiber preform is preferably thermally drawn in a high-viscosity regime, e.g., >$10^6$ Pa s, and the fiber drawing temperature selected is preferably sufficiently high to allow for the preform to be drawn continuously into a fiber. The fiber can be rapidly cooled (e.g., with active cooling) after fiber drawing to arrest the development of axial instability. The fiber drawing can optionally include two or more fiber drawing steps. This fiber drawing process can produce an axially stable fiber core having a diameter from, e.g., 3 nm to >1 mm, e.g., between about 1 mm and less than 100 nm, setting the lower and upper limits on the sizes of particles to be subsequently formed. These steps of preform production and consolidation, and fiber drawing are described in U.S. Pat. No. 7,295,734, issued Nov. 13, 2007, to Bayindir et al., the entirety of which is hereby incorporated by reference.

Step 103 comprises thermally treating the extended multi-material fiber under conditions (e.g., temperature, time, and for some applications, tapering speed) that cause an axial breaking up of the continuous extended core to form a plurality of core particles embedded in the cladding. The maximum temperature utilized in step 103 is generally higher than the maximum temperature used in step 102, such as by a temperature higher by at least 10° C. In this step the thermal treatment of the drawn fiber controllably induces the break-up of the extended core(s). In a typical embodiment the extended core breaks up into an orderly (periodic) sequence of oriented, smooth-surfaced structured spherical particles held immobile in the fiber cladding; the cladding material engulfs the particles and holds the particles separated from each other. The thermal treatment can comprise holding a temperature fixed along a longitudinal fiber axis of the multi-material fiber, and using a sufficient heating time to form the plurality of core particles.

In contrast to the rapid cooling that is preferred after fiber drawing, here it is preferred to maintain an elevated temperature along the fiber axis for an extended time period that produces the break-up of the fiber core into droplets, as described in detail below. In another embodiment the thermal treating can comprise applying a temperature gradient along a fiber axis of the multi-material fiber. In either process, the resulting droplets are frozen in situ upon cooling to produce a sequence of particles along a longitudinal line that is parallel to the longitudinal fiber axis, with the particles interior to the fiber cladding material.

In optional step 104, the resulting core particles are released from the cladding. For example, the core particles embedded in the cladding may be released by dissolving the cladding material in a suitable solvent that preferably does not affect the core particles. For example, given an organic polymer cladding, e.g., polyethersulphone (PES), this polymer cladding can be dissolved in a solution of, e.g., dimethylacetamide (DMAC), in applications in which the particles are formed of an inorganic material such as an inorganic glass. In general, for arrangements in which the core materials are inorganic, the fiber polymer can be dissolved using a standard organic solvent, which retains the resulting particles intact.

But for many applications the core particles can be employed held immobilized in the fiber cladding material, rather than released from the cladding. While embedded in the fiber cladding, the particles are isolated from each other and therefore cannot agglomerate in the manner often occurring in conventional nanoparticle synthesis. Being disposed interior to, or internal to, the fiber cladding material, each particle is provided with a buffer between it and all other particles, even for very large particle density. Thereby, this arrangement of embedded particles within a fiber cladding layer can be employed for applications, e.g., in which there is required a three-dimensional distribution of particles in a uniform matrix.

The in-fiber particle fabrication process is schematically represented in FIG. 1B. A fiber preform 110 is assembled with the materials selected for particle production, e.g., a selected preform core material 112 corresponding to a desired particle composition, and one or more cladding or other fiber preform layers 114 that are different than the core material. During the fiber drawing process, the fiber preform 110 is thermally drawn down to a fiber 115, of an extended longitudinal-axis length; the drawn fiber can be many hundreds of meters in length.

After fiber drawing, the cooled drawn fiber 115 is heated by a selected heating source 118 at a heating temperature, T, for a heating duration, t, that is sufficient to reduce the viscosity of the core material(s) to a level that causes instability in the core material(s) due to perturbations at the core-cladding interface. This instability causes the core 120 of the drawn fiber to break-up into uniformly-sized droplets 122. The heating source can be local or global, and the representation in the figure is for clarity only and not meant to be limiting. The core material droplets are solidified upon cooling of the fiber, producing a longitudinal sequence of spherical particles 124 disposed along line that is parallel to the longitudinal fiber axis, in at least a portion of the fiber length, with the particles being engulfed and separated from each other by the cladding material. For some applications, there can be imposed uniform spacing between the particles, and with a spacing between particles being greater than particle diameter. If desired, after particle production, the fiber cladding can then be removed, e.g., in solution, providing released particles 126 for use in a given application, e.g., as-suspended in a solution 128.

Although not necessary to practice disclosed embodiments, the breaking up of the extended core(s) of the drawn multi-material fiber into a plurality of particles is believed to be based on Plateau-Rayleigh (PR) capillary instability during the thermal treating of the drawn fiber. In one particular embodiment the fiber core can comprise a glass and the cladding comprises an amorphous thermoplastic polymer. PR instability is believed to be manifested in the breakup of the core into a periodic string of size-tunable micro-scale droplets embedded along the fiber axis. As disclosed above, size tuning can be provided by fiber drawing, or can be provided by fiber tapering, described below, such that the extended core(s) has a cross sectional dimension (e.g., a diameter) that approaches the desired particle size.

In the fiber core break-up into spherical particles, the heating temperature, T, is applied for a duration, t, that is sufficient to cause the development of a sinusoidal modulation at the core-cladding interface due to the PR capillary instability. In contrast to the rapid cooling that is employed in conventional fiber drawing processes, including the prior draw process employed to draw the fiber being thermally treated, in the thermal treatment the fiber is maintained at the elevated heating temperature, T, for the duration, t, that allows for the core break-up as the instability progresses. At break-up, the core is a high-viscosity fluid that forms the uniform droplets, which subsequently become spherical particles upon cool down from the heating temperature, T. As a result of this spherical particle formation process, the spherical particles are uniform, with a uniform particle diameter, and are arranged as a linear sequence of particles along the fiber axis, with uniform spacing between the spherical particles and the spacing between the spherical particles being greater than the particle diameter.

The conditions required to produce the spherical particles in-fiber can be analyzed by modeling the fiber core at the elevated heating temperature, T, as a viscous thread having a viscosity, $\mu_{core}$, and a diameter, $D_{core}$, that is surrounded by an infinitely extended viscous cladding, having a viscosity, $\mu_{clad}$. Based on the classical Tomotika linear stability theory, the instability growth time, $\tau$, i.e., the time scale determining the growth of a corresponding capillary instability wavelength, $\lambda$, of the fiber core, is given as:

$$\tau = \frac{D_{core}\mu_{core}}{\gamma\left[(1-x^2)\Phi\left(x, \frac{\mu_{core}}{\mu_{clad}}\right)\right]}; \quad (1)$$

where $\gamma$ is the surface tension between the core and cladding materials and $x = \pi D_{core}/\lambda$.

The function $\Phi(x)$ is given by:

$$\Phi(x) = \frac{N(x)}{D(x)}, \quad (2)$$

where $$N(x) \equiv I_1(x)\Delta_1 - \{xI_0(x) - I_1(x)\}\Delta_2, \text{ and} \quad (3)$$

$$D(x) \equiv$$
$$\left(\frac{\mu_{core}}{\mu_{clad}}\right)\{xI_0(x) - I_1(x)\}\Delta_1 - \left(\frac{\mu_{core}}{\mu_{clad}}\right)\{(x^2+1)I_1(x) - xI_0(x)\}\Delta_2 -$$
$$\{xK_0(x) + K_1(x)\}\Delta_3 - \{(x^2+1)K_1(x) + xK_0(x)\}\Delta_4,$$

where $I_n(x)$ and $K_n(x)$ are the modified Bessel functions of the nth order, and $\mu_{core}/\mu_{clad}$ is the viscosity ratio between the fiber core and the surrounding fiber material, such as fiber cladding.

In Expression (3), $\Delta_1$, $\Delta_2$, $\Delta_3$, and $\Delta_4$ are all functions of x expressed in determinantal forms as follows:

$$\Delta_1 = \begin{vmatrix} xI_0(x) - I_1(x) & K_1(x) & -xK_0(x) - K_1(x) \\ I_0(x) + xI_1(x) & -K_0(x) & -K_0(x) + xK_1(x) \\ \left(\frac{\mu_{core}}{\mu_{clad}}\right)xI_0(x) & K_1(x) & -xK_0(x) \end{vmatrix},$$

$$\Delta_2 = \begin{vmatrix} I_1(x) & K_1(x) & -xK_0(x) - K_1(x) \\ I_0(x) & -K_0(x) & -K_0(x) + xK_1(x) \\ \left(\frac{\mu_{core}}{\mu_{clad}}\right)I_1(x) & K_1(x) & -xK_0(x) \end{vmatrix},$$

-continued $$\Delta_3 = \begin{vmatrix} I_1(x) & xI_0 - I_1(x) & -xK_0(x) - K_1(x) \\ I_0(x) & I_0(x) + xI_1(x) & -K_0(x) + xK_1(x) \\ \left(\frac{\mu_{core}}{\mu_{clad}}\right)I_1(x) & \left(\frac{\mu_{core}}{\mu_{clad}}\right)_1 xI_0(x) & -xK_0(x) \end{vmatrix}, \text{ and}$$

$$\Delta_4 = \begin{vmatrix} I_1(x) & xI_0(x) - I_1(x) & K_1(x) \\ I_0(x) & I_0(x) + xI_1(x) & -K_0(x) \\ \left(\frac{\mu_{core}}{\mu_{clad}}\right)I_1(x) & \left(\frac{\mu_{core}}{\mu_{clad}}\right)_1 xI_0(x) & K_1(x) \end{vmatrix},$$

In one technique for determining a suitable heating time for producing spherical droplets out of a fiber core material or materials, the fastest growing instability wavelength, $\lambda$, is determined for a selected value of fiber core diameter, $D_{core}$, and a selected heating temperature, T, by numerically evaluating the following expression based on the expressions given above:

$$\max_\lambda[(1-x^2)\Phi(x,\mu_{core}/\mu_{clad})]. \quad (4)$$

The shortest, or fastest, instability growth time, $\tau_{fastest}$, is determined by the evaluation of Expression (4) above, and corresponds to the fastest growing instability wavelength. If the fiber is subjected to the heating temperature, T, for a time, t, that is at least as long as $\tau_{fastest}$ ($t \geq \tau_{fastest}$), then the capillary instability of the core can drive the continuous core to break-up into droplets, for the given fiber materials, selected core diameter, and selected heating temperature. For heating times less than the determined value of the smallest instability growth time, $\tau_{fastest}$, ($t < \tau_{fastest}$) the core will remain intact and not break-up.

Thus, in determining the process conditions for achieving fiber core break-up, iterative analysis with various process and material parameters can be employed to obtain a suitable process that produces spherical particles out of selected materials. FIG. 1C is an example plot for such an analysis. In this example, there is selected a fiber arrangement including a single core material of $As_2Se_3$, which has a viscosity that is temperature-dependent and therefore obtained from an empirical Arrhenius formula, and an outer cladding layer of polyethersulfone (PES), having a viscosity of $10^5$ Pa s. The surface tension between $As_2Se_3$ and PES is 0.1 N/m. With these parameters, the expressions above can be evaluated as a function of heating temperature, T, and core material diameter, $D_{core}$. In general, the shortest instability growth time, $\tau_{fastest}$, at which break-up of the core will occur, corresponding to the fastest growing instability wavelengths, $\lambda$, is linearly proportional to the core diameter, $D_{core}$, and linearly dependent on the core viscosity, which is a function of the heating temperature, T. In this model, a fiber core will break-up, for any fixed heating temperature, T, after heating for a duration that is sufficient for the requisite PR instability to be initiated.

For the $As_2Se_3$ example fiber core material being considered here, with a selected heating temperature of 270° C., the viscosity of the $As_2Se_3$ core material is about $10^5$ Pa s. For a $As_2Se_3$ core diameter of 10 µm, the smallest calculated PR capillary instability time, $\Sigma_{fastest}$, determined by evaluation of the expression above, is given as about 150 seconds. Thus, in this example, when the $As_2Se_3$-PES fiber is heated at a temperature of 270° C. for at least about 150 seconds, the $As_2Se_3$ core will break-up into uniform spherical particles. The plot of FIG. 1C demonstrates how this required heating duration shifts based on fiber core diameter and on heating temperature. Thus, there can be determined a heating duration that will produce spherical particles for a selected set of fiber materials, fiber core diameter, and heating temperature.

The thermal treatment of a fiber to produce in-fiber spheres can be implemented in any suitable manner. In a first example implementation, a section of a drawn fiber is locally heated in a relatively short heating zone, e.g., about 7.5 mm-long, resulting in the production of particles having a diameter that is equal to that of the fiber core created only in the localized heating section. In this process, sections of the fiber can be heated in sequence, down the length of fiber. In a second example implementation, an extended fiber length is globally heated in a furnace. In this global heating technique, particles are produced having a diameter that is about twice the diameter of the fiber core along the whole fiber length. Although this global heating technique generally produces larger particles, the global heating technique enables the simultaneous production of particles along extended fiber lengths, and given a more uniform temperature distribution along the length of the fiber being thermally treated, reduces the size dispersion in particles produced.

In the localized-heating scenario, the tension in the heating section is released, from that tension that was employed during thermal fiber drawing, and the fiber narrows at the expense of the fiber materials, such as the polymer, accumulating at the edges of the hot zone. The reduction in diameter of the fiber on average is in this case by a factor of about 2. In the global-heating approach, the whole fiber is placed in a furnace. The fiber tension is also released from that during fiber drawing, and the core diameter resulting after heating is typically a factor 1-1.5 larger than the initial diameter, depending on the tension during the fiber drawing process. Accordingly, the diameter of the particles after fiber core material break-up is 2-3 times larger than those produced by localized heating. These factors may be precompensated for by producing an appropriate core diameter in a preform and corresponding drawn fiber.

Figure 2A:
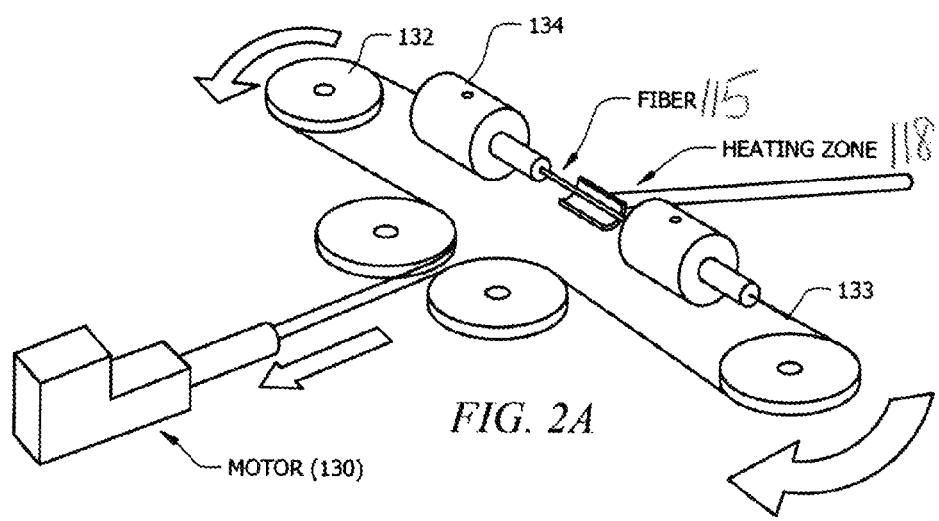
FIG. 2A shows an example fiber tapering setup.

In a further heating scenario, there can be employed a fiber tapering process. Fiber tapering is a process that allows for obtaining a wider range of parameters as compared to fiber drawing. Referring to FIG. 2A, steps for heating a fiber in an example fiber tapering apparatus are shown. In fiber tapering, a fiber 115 is inserted in a movable heating zone 118 for a fixed (predetermined) time before both ends of the fiber are pulled symmetrically in opposite directions by the motor 130 together with rollers 132, cabling 133 and end holders 134 as shown in FIG. 2A.

There are generally at least three controllable fiber tapering parameters that may be used for process control during the fiber heating. A first parameter is the temperature, T, which determines the viscosity of the respective fiber materials. The second parameter is the tapering distance, L, which is defined as the length by which the fiber is elongated after softening, that determines the final diameter (or other cross sectional area) of the fiber taper. A third parameter is the tapering speed, υ, which determines the dwelling time in the heating zone 118. Once the tapering ends, the heating zone is removed and the extended fiber can be cooled, such as in air. Alternatively, active cooling may be used.

Figure 2B:
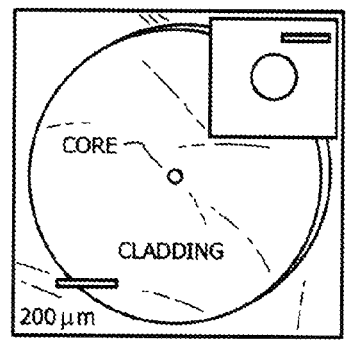
FIG. 2B is a scanned optical micrograph of a fiber cross section with a 20-µm core diameter.
Figure 2C:
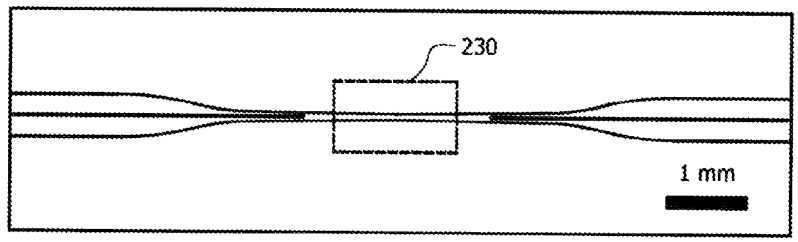
FIG. 2C a scanned image of a typical fiber taper.
Figure 2D:
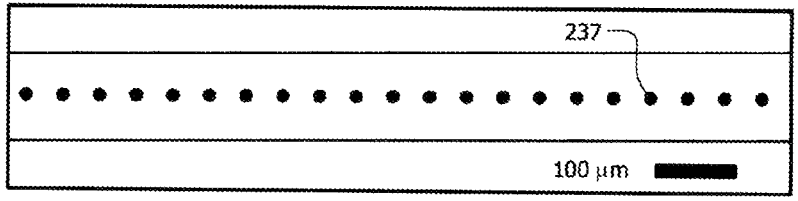
FIG. 2D shows a magnified scanned image of the taper center corresponding to the dotted box in FIG. 2C, showing the core broken into a periodic string of core droplets oriented along the axial (drawing) direction, according to example embodiments.

In the example fiber described above, with a glassy chalcogenide semiconductor $As_2Se_3$ core having a diameter in the range 5 µm-20 µm with a thermoplastic polymer cladding comprising PES having an outer diameter of 1 mm, such can be employed in a fiber taper process as depicted in FIG. 2B. An example of a typical taper is shown in FIG. 2C, with the central tapered section 230 observed after the continuous and uniform extended glass core evolved into a periodic string of core droplet particles 237 as depicted in FIG. 2D. It is noted that the apparent size of the core in FIG. 2C and the droplets in FIG. 2D are larger than their actual sizes due to magnification resulting from the curvature of the fiber outer surface.

With these thermal processes for treating a fiber to produce particles in the fiber, there can be produced substantially perfectly spherical particles having an exquisitely smooth-surfaced external morphology. Such can be produced over an extremely broad range of particle dimension, e.g., with a starting fiber core diameter ranging from millimeters down to nanometers, for example, ranging from 2 mm down to 20 nm. This size span corresponds to five orders of magnitude in linear dimension, and fifteen in volume, from about 8 mm$^3$ to about 8,000 nm$^3$.

Figure 3A:
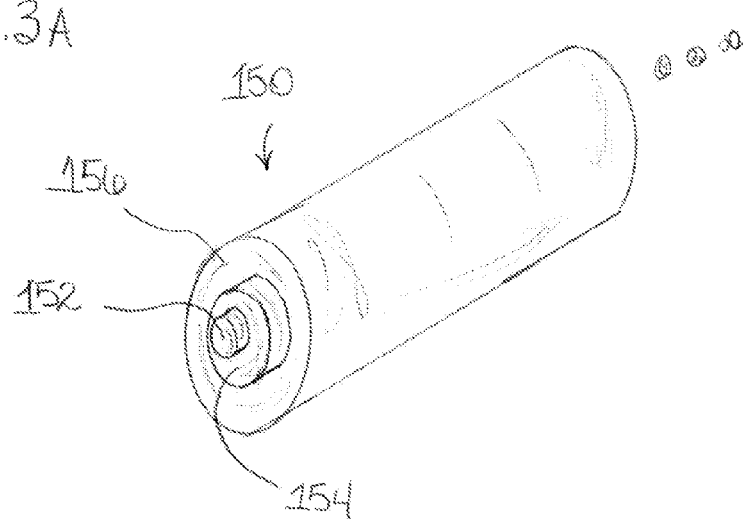
FIG. 3A is a schematic perspective view of a fiber including concentric core materials for production of a spherical core-shell particle.

A wide range of particle structures can be produced by these thermal processes. In a first example, homogeneous spheres of fiber core material can be produced, of electrically conducting, electrically semiconducting, or electrically insulating material. Alternatively, the spherical particles can include nonhomogeneous regions of materials, i.e., a plurality of distinct materials can be included in the spherical particle, in any suitable arrangement. For example, the produced spheres can exhibit a core-shell construction; i.e., the produced particles can be fabricated as spherical cores each surrounded by a spherical shell. Referring to FIG. 3A, in a fiber preform 150 for producing such core-shell spherical particles, there is provided a fiber core 152, e.g., a polymer core material, having a core diameter, $D_1$. A cladding layer 154, e.g., a glass cladding layer, is provided around the core 152, having a diameter $D_2$, with $D_2 \approx 2.5 \times D_1$. A scaffolding layer 156, e.g., a polymer layer, is provided around the cladding layer 154. After consolidation, this preform is drawn down to a fiber the corresponding core-cladding-scaffold arrangement.

Figure 3B:
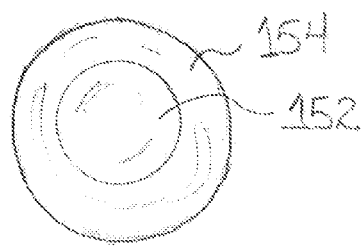
FIG. 3B is a schematic cross-sectional view of a spherical core-shell particle produced with the fiber of FIG. 2A.

Then, when subjected to a post-draw thermal process, the polymer core and glass shell undergo a correlated PR-driven break-up that results in the formation of core-shell particles along the length of fiber, with the core-shell particles held immobilized in the polymer scaffold fiber cladding material. FIG. 3B is a cross-sectional view of such a core-shell sphere, including a spherical core of fiber core material 152 having a cladding material 154 as a concentric spherical shell around the core.

Figure 3C:
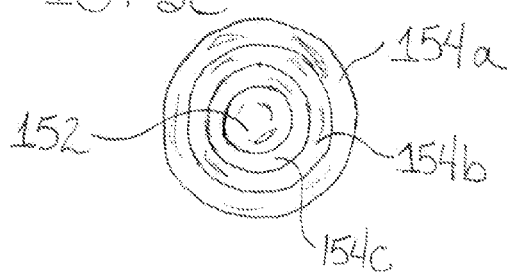
FIG. 3C is a schematic cross-sectional view of a spherical core-shell particle including a plurality of spherical shells.

Referring to FIG. 3C, this geometry and process can be extended to produce spheres including a plurality of concentric, nested, spherical shells 154a, 154b, 154c, surrounding a spherical core 152. In this case, multi-layered spherical particles are produced. Here, the fiber preform is assembled including nested layers of appropriate thicknesses of layers around a central cylindrical core material. The preform is then drawn into a fiber of desired diameter, and exposed to a post-draw thermal process that causes the break-up of the cylindrical layers and central core materials into spherical particles each produced by an evolution of concentric shells around a spherical core.

Figure 4A:
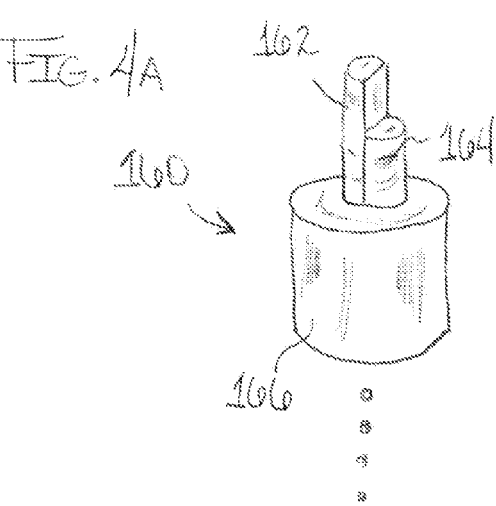
FIG. 4A is a schematic, perspective, cut-away view of a fiber including two half-cylinder core materials for production of a spherical Janus particle.

A second example of a structured particle that can be produced by the post-draw thermal processing described herein is a broken-symmetry, spherical Janus particle, comprising two hemispheres of different materials, e.g., two different optical glasses, such as $As_2S_3$ and $((As_2Se_3)_{99}Ge_1)$, that can be co-drawn with a polymer into a fiber. FIG. 4A is a schematic cut-away view of such a fiber 160 arranged for Janus particle production. In formation of the fiber, there is assembled a preform including a half cylinder of each of the selected core materials, wrapped in a selected polymer material. After fiber draw, the fiber includes a first half cylinder 162 and a second half cylinder 164 of the two selected core materials, surrounded by a cladding layer 166.

Figure 4B:
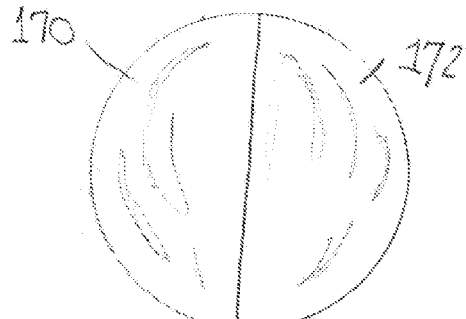
FIG. 4B is a schematic cross-sectional view of a spherical Janus particle produced with the fiber of FIG. 4A.

Thermal processing of the fiber is then conducted to cause formation of Janus particles of the fiber core. Referring to FIG. 4B, the thermally-induced break-up of the core materials produces spherical Janus particles 168 having a first hemisphere 170 and a second hemisphere 172, corresponding to the first half cylinder 162 and the second half cylinder 164, respectively, in the fiber. The figure is a cross-sectional view; each Janus particle is a three-dimensional, two-compartment, spherical structure. The Janus particles are held immobilized along the length of the fiber, within the polymer cladding, all with the same orientation of materials along the fiber length.

In the successful production of Janus particles by the thermal methods described herein, it can be preferred, for glassy core materials, that the selected glasses be characterized by a relatively low glass-glass surface tension, and the core and cladding be characterized by a similar glass-polymer surface tension. With these considerations, the two-compartment Janus particle spheres are produced along the length of a fiber.

The core-shell particles and two-compartment Janus particles just described are prototypical structures from which more complex geometries can be constructed based on the post-draw thermal processing described herein. For example, multilayer particles can be produced including a core of nested cylindrical shells of appropriate thicknesses, and within the nested core, azimuthal compartments can be provided by arranging the core with azimuthal sections. Each of the cylindrical shells and each of the azimuthal sections can be provided as distinct materials, or selected materials can be alternated or otherwise arranged in a selected configuration for the particle.

Figure 5A:
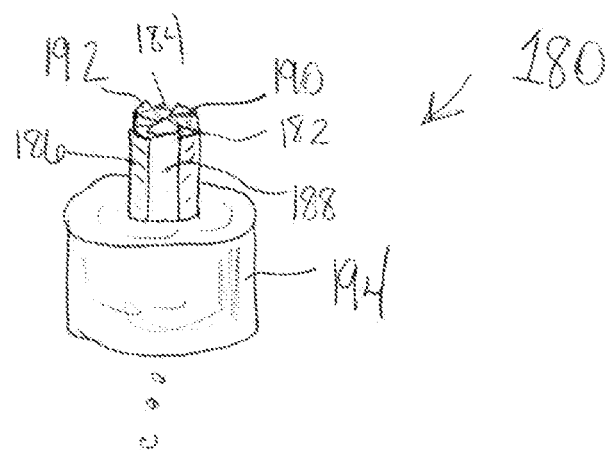
FIG. 5A is a schematic, perspective, cut-away view of a fiber including an azimuthal arrangement of core material sections for production of a spherical 'beach ball' compartmentalized particle.
Figure 5B:
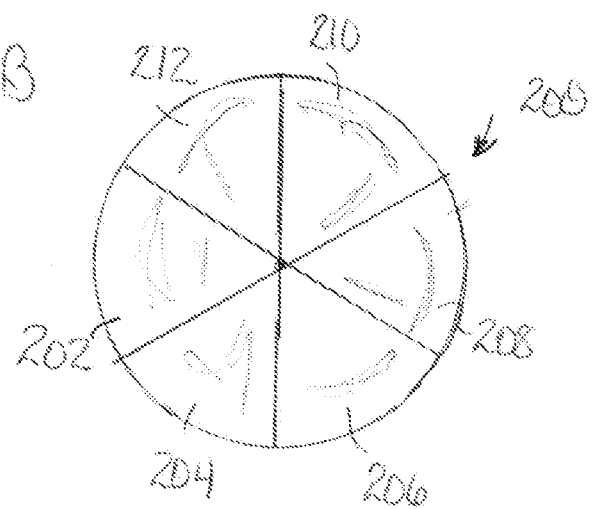
FIG. 5B is a schematic cross-sectional view of a spherical 'beach ball' particle produced with the fiber of FIG. 5A.

In one example of such an extended azimuthal design, there is shown, in FIG. 5A a fiber 180 including a core of six wedge-shaped sections of alternating materials 182, 184, 186, and 188, 190 192, employing, e.g., the two glasses employed in the Janus particle example above, or other arrangement of glasses or other materials that can be co-drawn. A polymer cladding 194 is disposed around the core arrangement. With this fiber configuration, there can be produced, as shown in FIG. 5B, a 'beach ball' particle 200, a cross section of which is shown. The particle 22 is a three-dimensional, six-compartment, spherical structure, having six distinct azimuthal compartments 202, 204, 206, 208, 210, and 212.

In the production of these many examples of particle geometries, a fiber preform is assembled that exhibits the corresponding macro-scale arrangement of materials. For example, in the production of spherical particles, a selected core material for producing spheres of, for example, $As_2Se_3$, is provided, e.g., as a 10 mm-diameter, 10 cm-long cylindrical rod. Such can be produced by, e.g., melt-quenching a commercial glass, available from, e.g., Amorphous Materials, Inc., Garland, Tex. A thin cladding material, e.g., a 75 µm-thick layer of PES, is then rolled around the rod, to produce a preform for the thermal production of homogeneous $As_2Se_3$ spheres. The resulting preform is consolidated, e.g., under vacuum at a suitable temperature for the given preform materials, e.g., 225° C. The preform is then thermally drawn into a fiber; drawing a preform with diameter $D_o$ and length $L_o$ by a factor N results in a fiber of diameter $D_o/N$ and length $N^2 L_o$. Where multiple cores are to be provided within a single fiber, a selected number of drawn fibers, each including one or more fiber cores, are stacked as a preform assembly, consolidates, and drawn together to form a composite, multi-core fiber. The drawing and stacking of cores can be reiterated as-desired.

In the formation of the core-shell particles like that in FIG. 3B-3C, a preform can be produced by, e.g., extruding a cylindrical billet, such as a 30 mm-diameter cylindrical billet, through a circular die, e.g., a 12 mm-diameter die. An example of such a billet consists of three discs: a first, top disc is polymer, a middle disc is glass, and a bottom disc is again polymer, with heights of, e.g., 30 mm, 20 mm, and 20 mm, respectively. The billet is heated to above the softening temperature and then pushed vertically downward through the die under pressure. The resulting extruded rod can then be employed as a preform to draw a fiber for production of a core-shell particle.

In the formation of Janus particles or other azimuthally-structured particles such as the 'beach ball' particle of FIG. 5B, there is arranged in a corresponding fiber preform the requisite materials having an arrangement of shapes for production of particle compartments. For example, in production of the Janus particle of FIG. 4B, a preform is assembled by providing two glass half-cylinders, e.g., two 12 mm-diameter, 30 mm-long structures, provided by, e.g., by melt-quenching. Here it is preferred that the two materials, e.g., two optical glasses, have approximately similar viscosities at the target particle break-up temperature, ~350° C.-400° C. A cylinder can be formed from the two half-cylinders and then arranged as the core of a preform by rolling a cladding layer, e.g., a thin layer of PES, around the two half cylinders. The preform is then consolidated under vacuum. The preform is then drawn into a fiber for thermal Janus particle fabrication.

A multi-section 'beach ball' particle like that of FIG. 5B can be produced from a preform arrangement corresponding to the fiber structure shown in FIG. 5A. The preform core can be assembled from six sections, for example, three each from two different glasses. In this example, the two glasses can be extruded, e.g., using a die with the shape of the desired 60° 'pie' sections, to produce the requisite core arrangement of materials. Any number of sections can be employed. A cladding layer, e.g., a thin layer of PES, is then rolled around the assembled sections, and the preform is consolidated under vacuum. The preform is then drawn into a fiber for thermal particle fabrication.

After thermal particle formation, the various structures can be released from the fiber matrix, e.g., the fiber cladding phase of the fiber, by removing the cladding material. If the fiber matrix is an organic material, such as a polymer, and the particle materials are all inorganic, then an organic solvent can be employed to dissolve the polymer. For example, the fiber can be placed in, e.g., a watch glass filled with N, N-Dimethylacetamide (DMAC), e.g., having a 99% concentration at room temperature, to dissolve the polymer, with fresh DMAC replacement as the dissolving proceeds. With four or five iterations, the polymer matrix is substantially completely removed. For applications in which a large quantity of particles is required, a large number of particle-embedded fibers are placed into a suitable vessel, e.g., a beaker, for an extended duration, e.g., 1-2 hours, at room temperature. With this duration, the particles are completely released from the fiber cladding matrix. No particular particle release process is required, and any suitable method that removes fiber cladding material can be employed.

Whatever particle release method is employed, there can further be carried out surface passivation of the particles to prevent agglomeration of the particles. One particular advantage of the particle formation processes described herein is the function of the fiber cladding phase to isolate each particle so that particles embedded in a fiber, as-produced, cannot agglomerate in the fiber. To preserve this highly-desirable particle isolation, the particles can be processed during release from the fiber, can be processed at the time of release from the fiber, or processed subsequent to release from the fiber. For example, the particles can be coated with a selected spray species, e.g., a polymer spray, to form a layer on the particles as the fiber cladding material is dissolved or otherwise removed. Alternatively, the fiber cladding removal can be conducted in a flowing solution that includes a high concentration of a particle-coating material. Here the flow of the solution can be employed to maintain spacing between the particles as the particles are released from the fiber. Further, the particles can be exposed to a passivating agent, such as an oxidizing environment, that prevents agglomeration. These examples demonstrate that a wide range of processes can be applied to prevent agglomeration of particles upon release from the fiber.

Disclosed embodiments also include compositions of matter comprising a plurality of core particles embedded in a scaffold. In one embodiment an embedded particle arrangement comprises a multi-material fiber having a length ≥one hundred times its cross sectional area, where the multi-material fiber includes a cladding material providing a continuous phase for said multi-material fiber, and a plurality of particles along at least a portion of the fiber length embedded in the cladding material. The plurality of particles are separated from one another, have a median size of any suitable diameter, e.g., from 5 nm to 1 mm, are spherical in shape, and can be molecularly smooth.

The cladding material in one embodiment comprises a polymer, such as a thermoplastic polymer. For embodiments corresponding to use of performs including a plurality of cores, the plurality of particles are arranged in a three dimensional distribution. The three-dimensional distribution of particles can include periodicity providing a standard deviation of center-to-center particle spacing <5% of the average center to center particle spacing in at least a first and a second dimension transverse to the length dimension of the multi-material fiber. As described above, the transverse periodicity is controllable at the fabrication stage through the stack-and-draw process. A periodicity of <15% (such as about 10%) of the average center-to-center particle spacing can also be provided in the length dimension of the multi-material fiber. The plurality of particles can be uniformly sized providing a <10% standard deviation in particle size with respect to an average (mean) size of the particles. The mean particle size depends on the core diameter of the fiber employed in particle production. The particle size distribution around a mean therefore depends on several factors, including the uniformity of the core diameter along the fiber axis; this factor can be optimized by careful control of fiber drawing parameters. In addition, the uniformity of the temperature distribution in the heating zone of the furnace employed in post-draw thermal break-up of the core impacts the particle size distribution. Optimization of furnace geometry can be preferred to carefully control furnace temperature. Finally, it is found that statistical fluctuations that initiate the fiber core break-up process result in residual fluctuations in the particle size distribution.

Disclosed particles can comprise spherical particles including a first hemisphere comprising a first material and a second hemisphere comprising a second material different from the first material. In this embodiment the first material can comprise a first glass and the second material a second glass different from the first glass to provide "Janus particles" that are generally defined as spherical glass particles with one of the hemispheres being one material and the other hemisphere being another material. Disclosed processing may also be extended to multiple sectors (e.g., 3, 4, 5 . . . ) of a cylinder to form spherical particles with more sophisticated sub-structure.

Applications for disclosed particles are numerous. Example applications include cosmetics, biomedical (e.g., drug delivery), chemical and biological catalysts, and paints (particles are held as a colloid in a solution).

EXAMPLES

Disclosed embodiments are further illustrated by the following specific Examples, which should not be construed as limiting the scope or content of this Disclosure in any way.

Example parameters tested include an initial $As_2Se_3$ core diameter of 40 µm and PES cladding tapered at a fixed speed $\upsilon=2$ mm/s and tapering distance d=15 mm, but with varying temperature, T. $As_2Se_3$ is known to have a melting point of about 360° C. and a glass transition temperature of about 180° C. The PES used had a glass transition temperature of about 230° C. When the fiber temperature rises sufficiently above both of the glass transition temperatures and the viscosity decreases sufficiently, PR instability is believed to be initiated through perturbations at the core/cladding interface.

Figure 6A:
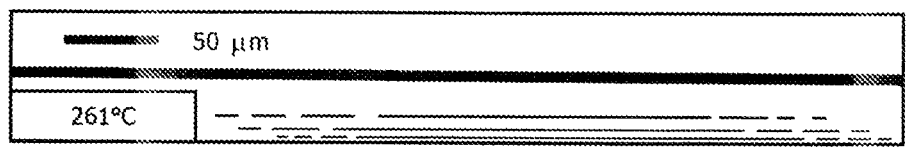
FIGS. 6A-6E are scanned optical micrographs of the side view of fiber tapers produced at different temperatures, but with the same tapering speed (2 mm/s) and tapering distance (15 mm) showing different stages of the core breakup process, according to example embodiments.
Figure 6B:
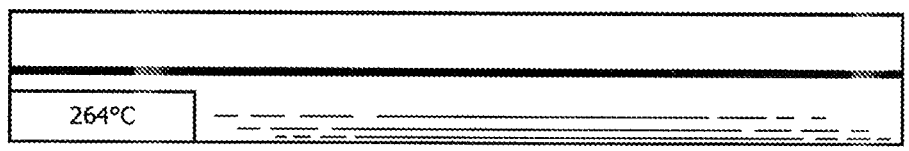
Figure 6C:
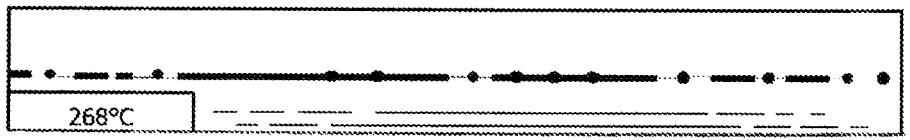
Figure 6D:
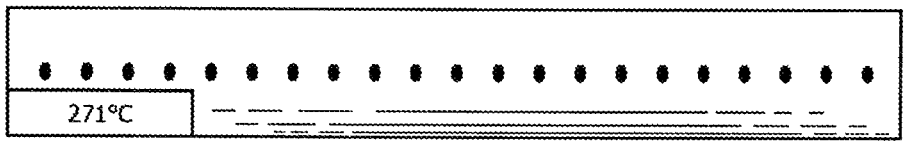
Figure 6E:
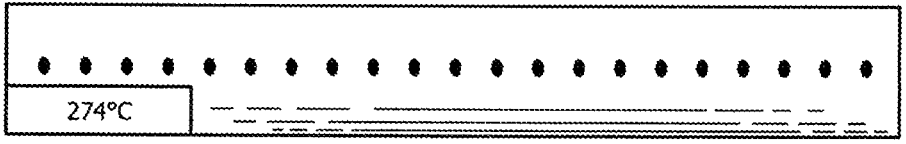

Referring to FIGS. 6A and 6B, it was found that at relatively low temperatures, such as 261° C. and 264° C., respectively, the viscosity of the $As_2Se_3$ core is relatively large and the extended core remained intact during tapering, so that no core droplets were observed. However, as the temperature was increased, a gradual growth in the PR instability shown began at about 268° C. apparently resulting in the periodic string of periodic core droplets shown being formed, as shown in FIGS. 6C-E.

Static heating was also studied. Static heating as used herein refers to the only parameter being varied is the temperature (no pulling/tapering). The instability breakup time, $\tau$, of the core, was measured over the range of temperatures for fibers with an initial core diameter, where $\tau$ was measured from the start of heating until initiation of breakup.

In order to analyze these results quantitatively, there was adopted as a model the linear stability analysis of Tomotika [S. Tomotika, Proc. Roy. Soc. Lond. A 150, 322 (1935)], which describes a stationary viscous thread embedded in an unbound viscous fluid, as described above. According to this analysis, as previously explained, perturbations at the interface between the two fluids (core and cladding here) grow on a time-scale, $\tau$, that depends on the perturbation wavelength $\lambda$, the viscosities of the two fluids, core viscosity, $\mu_{core}$, and cladding viscosity, $\mu_{clad}$, the thread diameter (core diameter, $D_{core}$, assuming an unbound cladding for simplicity), and surface tension, $\gamma$. The wavelength with the largest growth rate, and minimum $\tau$, $\tau_{fastest}$, defined previously above, quickly dominates the instability and results in the fiber core breaking up into a periodic sequence of droplets with separation $\lambda$. The following values of the parameters were used in calculations: D=10 µm, surface tension between $As_2Se_3$ and PES, $\gamma=0.1$ N/m, and $\eta_p=10^5$ Pa·s for PES. While the temperature dependence of $\mu_{clad}$ over the temperature range of interest was ignored, $\mu_{core}$ for $As_2Se_3$ changes considerably over the same range and was obtained from an empirical Arrhenius formula. Using these values the instability growth time as a function of temperature was calculated and the results compared the results to the experimental data. The predictions of the Tomotika model are in quantitative agreement with the data of about 150 s for a temperature of 270° C. Further was calculated the break-up time, $\tau$, over the same temperature range for other initial core diameters. To a reasonable degree of accuracy, it was found that $\tau$ depends linearly on D at a fixed temperature.

Further, the breakup wavelength $\lambda$ is proportional to the fiber core diameter at the time of core breakup. From the Tomotika linear stability model, $\lambda$ is related to the core diameter D through $\lambda=\pi D/\eta$, where $\eta$ is a dimensionless constant that depends on the relative viscosities of the fiber core and cladding materials. Assuming incompressible flow of the core material, the diameter, $D_p$, of a droplet being formed and the core diameter at breakup, $D_{core}$, are related through $D_p=\sqrt[3]{3\pi/2\eta}D_c$. For $\eta=0.6$, which is typical for the example materials described herein, $D_p \approx 2D_c$. If the fiber initial core diameter is D, this implies that $D_p \approx D$ for the localized heating process, and $D_p \approx 2D$-$3D$ for the global heating process. As a result, the diameter of the produced particles can be, e.g., less than about 1 mm, less than about 1 micron, and less than about 100 nm.

Also examined was the effect of each fiber tapering parameter (L, T, and $\upsilon$) while holding the other two parameters fixed. A simple model for this system is based on a quasi-static extension to the static Tomotika model. This model decouples the effect of heating on the core from the dynamics of tapering. The static results for the temperature-dependent instability time, $\tau$, was therefore employed with the added geometric effect of size change during tapering. This model yielded results in quantitative agreement with observations despite its simplicity within the margin of error in the measurements performed.

The effect of tapering distance, L while holding the velocity, $\upsilon=1$ mm/s and T=285° C. was studied. The static results indicated that breakup occurs after about 80 s at this temperature with the initial core diameter $D_{core}=10$ µm. As the diameter decreases during tapering, $\tau$ decreases accordingly. It was found that the core remains intact until L=21 mm at which point it breaks up into a series of droplets with an average separation of 7.1 µm. After breakup has occurred in the taper, further elongation was found to only increase the droplet separation.

Making use of the above-described quasi-static model, and making use of the approximately linear relation between $\tau$ and diameter D, an estimate for D at the moment of breakup can be generated. Taking $\tau=21$ s, $D_{final} \sim 2.6$ µm is estimated. This estimate depends only on the measured instability time and the assumptions of the static Tomotika' model. An independent estimate was also achieved from a different route. Geometric considerations coupled with the simplifying but reasonable assumption that the temperature of the heating zone is uniform and the taper material exiting the heating zone cools down immediately lead to the initial and final core diameters being related by a factor of the form $e^{-L/h}$, where h is the length of the heating zone. Thus $D_{final}=De^{-L/h}=10\ e^{\{-21/17\}} \sim 2.9$ µm, consistent with the considerations described above. The last data point (at L=27 µm) was higher than expected since the fiber undergoes rapid plastic deformation before mechanical fracture with further tapering.

The effect of T for fixed $\upsilon=1$ mm/s and d=23 mm was next considered where the final taper diameter remains approximately constant. At low temperatures, the viscosity of the core was found to be relatively large and the core to remain intact. As the temperature increased, the PR instability grows until droplets are formed and the average period of the droplets increases with temperature. This may be understood as follows: viscosity decreases exponentially with temperature and the Tomotika model indicates that lower viscosity leads to linearly shorter instability time. The instability thus develops quickly at a larger diameter corresponding to a longer period. The period hence will exponentially increase with temperature. Furthermore, if the breakup occurs early on in the tapering process at higher temperature, then further tapering leads to further separation between the core droplets.

The effect of $\upsilon$ while holding d=23 mm and T=285° C. was next considered. The final diameter of the fiber taper is also approximately constant. At high speeds, the dwelling time may be less than $\tau$ for the final core diameter, and the core thus remains intact. At lower speeds, the fiber dwells for a longer time in the heating zone thus having the opportunity to reach $\tau$ and thus breakup. The breakup of the larger-diameter core during tapering results in longer period, and then the droplets further separate if the tapering process continues. The period was found to be inversely proportional with the drawing speed.

As noted above disclosed methods may be used to fabricate microparticles or nanoparticles. The particle size as disclosed herein may be tuned by adjusting the tapering parameters, and the physical process described here hence offers an unconventional non-lithographic, top-down approach to fabricating micro and nano-structures using non-traditional materials combinations. To demonstrate control over particle size, there were produced core particles at three different sizes, namely, 5 µm, 2 µm, and 1 µm, where particle size was tuned by varying the tapering speed.

There are a number of advantageous features of the disclosed in-fiber particle fabrication methods. First, the methods are amenable to a wide range of materials. The particles that are produced in the fiber can be electrically conducting, electrically insulating, or electrically semiconducting, and therefore can be provided as a metal, an insulator, or a semiconductor. Suitable materials include, e.g., glassy inorganic materials, such as chalcogenide glasses, low-melting-temperature metals, crystalline materials, including crystalline metals, polymers, and other materials, preferably that can be co-drawn into a fiber. Generally, a wide range of metals above their melting temperature, including, e.g., tin, indium, bismuth, cadmium, lithium, or other low melting-temperature metal, and alloys such as Sn—Ag, Sn—Sb, Sn—Cu, and other alloys can be employed, as well as suitable amorphous glassy metals. No particular material combination is required. The viscosities of the materials to be co-drawn are preferably compatible for fiber drawing, e.g., the viscosities of the materials can for some applications preferably be less than about $10^6$ Poise at a fiber draw temperature while maintaining the material integrity of the materials; such compatible materials in general exhibit an overlap in softening temperature.

Secondly, since the process can start from a macroscopic preform, including, e.g., a rod or cylinder, that is drawn into a fiber, particles of complex structure may be obtained through assembly of the rod with the prescribed structure. Janus particles, nested spherical particles, and complicated nonhomogeneous particles of different material segments can be produced. Thirdly, although the process described herein is generally not efficient in producing particles in terms of volume conversion, the efficiency may be increased by using multi-core fibers, i.e., fibers including a plurality of cores, e.g., three different cores, all of which can undergo break-up into particles.

One may further increase the number of cores until they become hydrodynamically coupled during tapering and the assumption of an unbound cladding breaks down But in general, for a fiber of 1 mm outer diameter to be processed by a non-tapering heating scenario, there can be provided, e.g., 12 20-µm cores, 4,000 500-nm cores, or even 27,000 200-nm cores. In principle there could be provided $10^8$ 50-nm cores in such a fiber, with 25% fill factor, all of which can be subjected to heat treatment for production of particles. This particle production technique far exceeds parallelization capabilities of particle production approaches such as microfluidics-based approaches. Furthermore, the resulting spatial distribution of particles produced from a large plurality of fiber cores is held immobilized in the fiber cladding scaffold and is well-ordered in three dimensions. The axial directions of the particles are ordered because the instability growth is dominated by a single wavelength. In the transverse dimensions, order is imposed on the fiber cores during the preform assembly process.

As disclosed above, the size of particles that may be fabricated using disclosed methods extends over a very wide range, such as extending from 1 mm down to less than 100 nm, and even as small as nanometers. The particles can be highly spherical particles. Moreover, the same procedure may be used with a wide variety of materials. For example, the above-described processes were demonstrated with a polymer core and polymer cladding. The same particle generation phenomena occur with polymer cores that occur with glass cores. Therefore, disclosed processes can also be used to fabricate micro- and nano-particles of polymers. The PR-driven breakup process is universal in the sense that it does not rely on the chemistry of the materials in the fiber to produce particles, but relies only on the physical parameters of viscosity and surface tension.

In an example of particle production from an all-polymer fiber structure, there can be provided a polymer fiber core, e.g., the polymer cyclic olefin copolymer (COC), while the fiber cladding, or scaffold matrix, can also be provided as a polymer, e.g., polycarbonate (PC), both of which polymers are biocompatible. With such an all-polymer fiber system, the breakup dynamics of the fiber core into particles are similar to those for, e.g., a glass-polymer fiber material system, with the dynamic range of polymer particles produced being similar to that for glass particles. Such an all-polymer system is particularly well-suited for, e.g., biomedical applications and in controlled-release drug delivery. Any suitable polymer combination can be employed, e.g., polyetherimide (PEI) and polysulfone (PSu), or other suitable polymer combination, including cyclic olefin polymer, poly-ether sulfone, poly-methyl methacrylate, and other such polymers. This demonstrates one example in which the spherical particles that are produced in the fiber are biocompatible. Any such biocompatible particle material having the requisite characteristics for the in-fiber production processes described herein can be employed for a wide range of biomedical and health-related applications.

Since the disclosed particle generation processes are top-down approaches that start from a structure at the macroscopic scale, the shape of the fiber preform, e.g., cylinder of the material, can be selected that is to be drawn into a fiber for break-up into particles. For example, as described above, two hemi-spheres of different materials can be used. The result is "Janus-particles", which are particles formed of two hemispheres of different core materials. The process may also be extended to multiple sectors of a preform cylinder to form spherical particles with a sophisticated sub-structure.

Disclosed embodiments include methods to form high-density macroscopic arrays of well-ordered nanowires that can range from nanometers to 1 mm. A centimeter-scale macroscopic cylindrical preform containing the nanowire material in the core encased in a polymer scaffold cladding was thermally drawn in the viscous state to a fiber. By cascading several iterations of the fiber drawing process, continuous reduction of the diameter of an amorphous semiconducting chalcogenide glass was demonstrated. Starting from a 10-mm-diameter rod thermally drawing was used to generate hundreds of meters of continuous sub-5-nm-diameter nanowires. Using this approach, macroscopic lengths of high-density, well-ordered, globally-oriented fiber core nanowire arrays can be produced.

Experimental results are provided below described relative to FIGS. 7A-9D which demonstrate the production of spherical particles following disclosed processing applied to a fiber preform including a large number of glass cores encased in a polymer cladding. In the axial (longitudinal-axis length) direction the resulting particles are ordered since the instability growth is dominated by a single wavelength. In the transverse dimensions particle order is imposed upon the cores during the stacking process to form the preform.

Figure 7A:
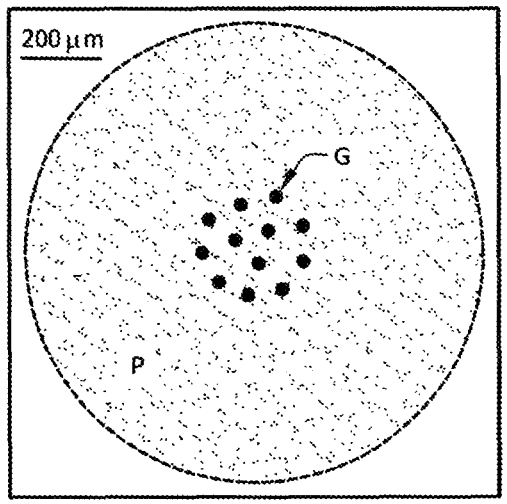
FIGS. 7A and 7B are scanned SEM micrograph of 12 20 micro-diameter intact glass cores exposed from a 1-mm-outer-diameter fiber cross section.
Figure 7B:
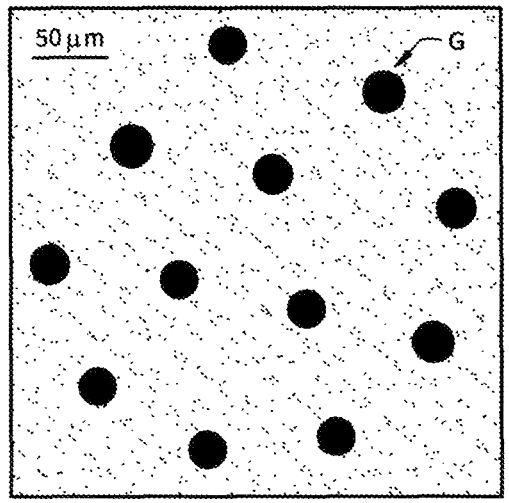

FIGS. 7A and 7B are scanned SEM micrograph of a 12-core fiber, with each core of 20 μm in diameter, for producing particles by a post-draw thermal process. In the figures, G represents the glass, $As_2Se_3$, and P represents the polymer, PES. Periodicity of the glass in the transverse directions is demonstrated.

Figure 8:
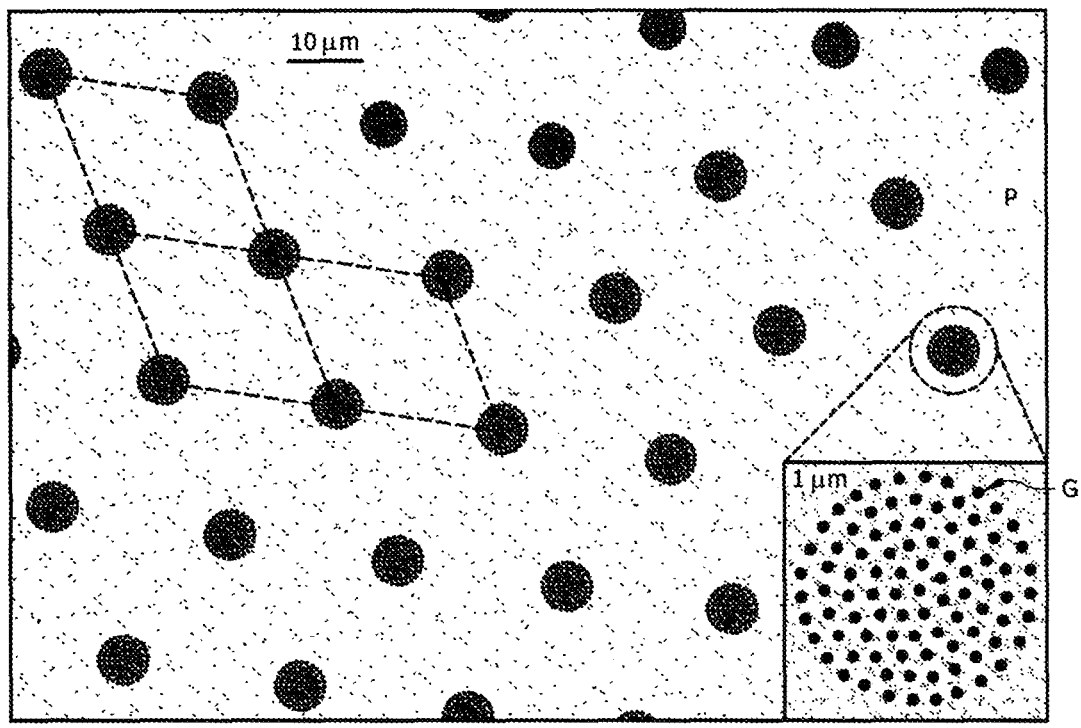
FIG. 8 is a scanned high-magnification SEM micrograph of a fiber including 27,000 cores each of 200 nm in diameter, with stacked fibers in the preform producing a hexagonal lattice (see dashed lines), and at each lattice site 80 200-nm glass cores located as shown in the inset.

FIG. 8 is a scanned high-magnification SEM micrograph of a portion of a fiber including 27,000 cores each of 200 nm in diameter. The stacked fibers in the preform were found to produce a hexagonal lattice (see dashed lines). At each lattice site 80 200-nm glass cores are located as shown in the inset. After break-up of these cores by thermally-induced PR, there is produced a three-dimensional arrangement of particles in the polymer cladding matrix that is periodic in all three dimensions. The periodicity in the two transverse dimensions is imposed by the stacking process, and the longitudinal periodicity of each core is an inherent result of the PR process.

Figure 9A:
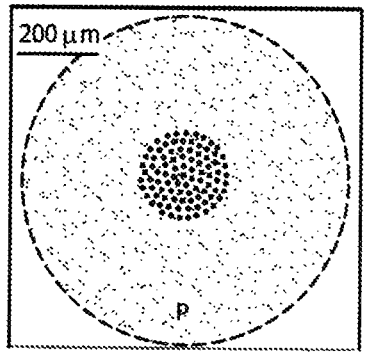
FIG. 9A is a scanned SEM micrograph of a 1-mm-diameter fiber cross section containing 80 7 μm-diameter cores, with P=polyethersulfone (PES)
Figure 9B:
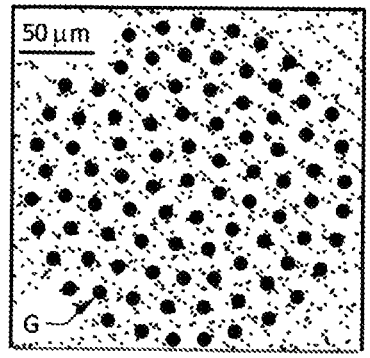
FIG. 9B is a higher-magnification scanned SEM micrograph of the 80 cores of FIG. 9A, with G=$As_2Se_3$.
Figure 9C:
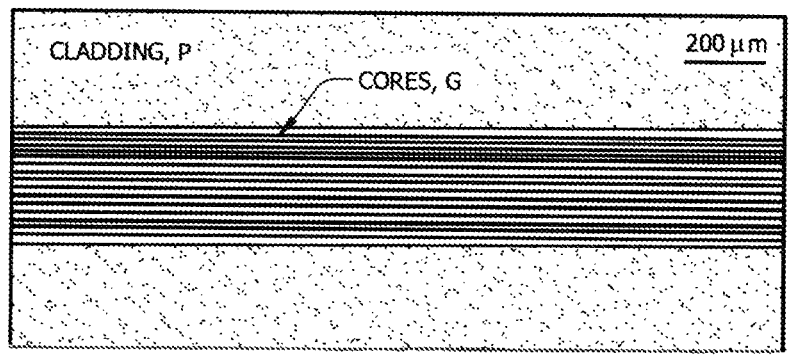
FIG. 9C is a scanned transmission optical micrograph of the side view of the fiber of FIGS. 9A-9B, before break-up (via global heating)
Figure 9D:
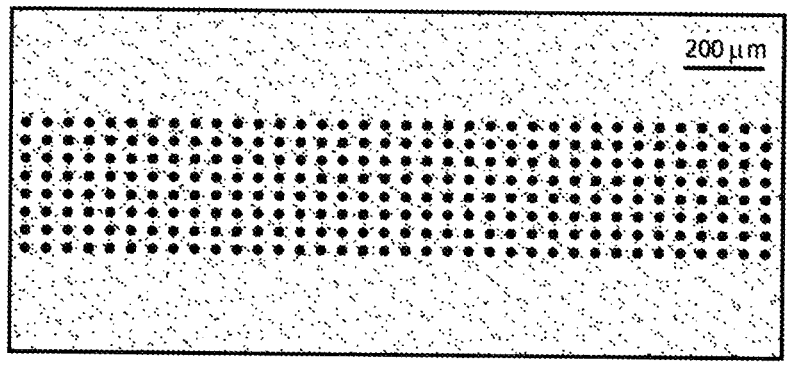
FIG. 9D is a scanned transmission optical micrograph of the side view of the fiber of FIGS. 9A-9B after break-up of the cores via global heating, showing that the resulting spatial distribution of particles immobilized in the cladding (scaffold) is well-ordered in all 3 dimensions.

FIGS. 9A-D are scanned SEMs demonstrating the resulting well-ordered, three-dimensional particle emulsion that can be produced held in the polymer cladding. FIG. 9A is a scanned SEM micrograph of a 1-mm-diameter fiber cross section containing 80 7-μm-diameter cores. FIG. 9B is a higher-magnification scanned SEM micrograph of the 80 cores, $G=As_2Se_3$ and P=PES. FIGS. 9C and 9D are scanned transmission optical micrographs of the fiber side view before and after breakup (via global heating), respectively, showing the resulting spatial distribution of particles held immobilized in the cladding (scaffold) is well-ordered in all 3 dimensions.

The description above makes clear that the post-draw thermal processing of fibers for in-fiber spherical particle generation enables the controllable production of complex and well-defined structures. These scalable thermal processes, in which there are first assembled disparate components that fit together, as a macro-scale preform, for scalable production of size-tunable structured spherical particles, enable a wide range of applications. The well-ordered, oriented, and immobilized particles that are produced by the thermal processing within a fiber scaffold layer can be employed for three-dimensional optical and acoustic metamaterials; the surface-tension-driven smooth spherical surface morphology of the particles enables optical-resonance-based sensitive detection of chemical species and pathogens; and three-dimensional structural control over such particles that are impregnated with drugs, e.g., in the preform stage, enable the realization of sophisticated controlled-release drug delivery systems.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for producing particles comprising:
   providing a drawn fiber having a longitudinal-axis fiber length and including at least one fiber core having a longitudinal core axis parallel to the longitudinal fiber axis and internally disposed to at least one outer fiber cladding layer along the fiber length;
   heating the fiber at a heating temperature, T, for a heating time, t, that is sufficient to cause at least one fiber core break up into droplets that are sequentially disposed along the fiber core axis; and
   cooling the heated fiber to solidify the droplets into spherical particles that are disposed along the fiber core axis over the fiber length, interior to the fiber cladding layer, as a longitudinal sequence of spherical particles that is parallel to the longitudinal fiber axis.

2. The method of claim 1 wherein heating the fiber comprises applying the heating temperature, T, locally to sections of the fiber in sequence along the fiber length.

3. The method of claim 2 wherein heating the fiber further comprises applying tension to opposite ends of the fiber during the heating to taper fiber diameter during the heating.

4. The method of claim 1 wherein heating the fiber comprises applying the heating temperature, T, globally along the fiber length.

5. The method of claim 1 wherein heating the fiber comprises applying the heating temperature, T, as a temperature gradient along at least a portion of the fiber length.

6. The method of claim 1 wherein the heating time, t, is greater than a duration for which a fiber core viscosity is sufficiently reduced to cause instability in fiber core material due to perturbations at an interface between the fiber core material and the at least one cladding material.

7. The method of claim 1 wherein the heating time, t, is at least as long as $\tau_{fastest}$, which is a minimum capillary instability growth time required for the fiber core to break up into droplets during the heating duration, and which is characteristic of the fiber based on fiber cladding material, fiber core material, fiber core diameter, and the heating temperature, T.

8. The method of claim 1 wherein providing a fiber comprises:
assembling a fiber preform including at least one fiber core material encircled by at least one layer of fiber cladding material;
consolidating the fiber preform; and
drawing the consolidated preform into a fiber.

9. The method of claim 8 wherein heating the fiber comprises exposing the fiber to a heating temperature, T, that is greater than a temperature at which the preform was drawn into a fiber.

10. The method of claim 1 further comprising, after cooling the heated fiber to solidify the droplets into spherical particles, removing fiber cladding material to release the spherical particles from the fiber.

11. The method of claim 10 further comprising passivating the spherical particles to prevent agglomeration of released particles.

12. The method of claim 1 wherein providing a fiber comprises:
assembling a fiber preform including a plurality of drawn fibers each including at least one fiber core surrounded by at least one layer of fiber cladding;
consolidating the fiber preform; and
drawing the consolidated preform into a fiber including a plurality of fiber cores.

13. The method of claim 1 wherein providing a fiber comprises providing a drawn fiber including at least one core material layer cylindrically disposed around a fiber core cylinder, together internally disposed to the outer fiber cladding layer along a longitudinal-axis fiber length, whereby cooling the heated fiber to solidify the droplets into spherical particles comprises forming particles including a spherical core surrounded by at least one spherical shell.

14. The method of claim 1 wherein providing a fiber comprises providing a drawn fiber including at least two core material layers cylindrically disposed around a fiber core cylinder, together internally disposed to the outer fiber cladding layer along a longitudinal-axis fiber length, whereby cooling the heated fiber to solidify the droplets into spherical particles comprises forming particles including a spherical core surrounded by a plurality of nested spherical shells.

15. The method of claim 1 wherein providing a fiber comprises providing a drawn fiber including at least one fiber core cylinder including a plurality of distinct materials arranged among azimuthal segments of the cylinder, each segment subtending a polar angle, whereby cooling the heated fiber to solidify the droplets into spherical particles comprises forming particles including a plurality of azimuthal segments, each segment subtending a polar angle.

16. The method of claim 15 wherein the spherical particle azimuthal segments are 180° segments, forming a broken-symmetry Janus particle.

17. A method of fabricating particles, comprising:
providing a multi-material preform having at least one fiber core comprising a first material and an outer first cladding layer, comprising a second material different from the first material, outside the fiber core;
thermal fiber drawing the multi-material preform to increase a length of said multi-material preform to form an extended multi-material fiber having an extended core, and
thermally treating the extended multi-material fiber under conditions that cause a break-up of the extended core to form a plurality of core particles embedded in the outer first cladding layer.

18. The method of claim 17, wherein the thermal fiber drawing comprises a first thermal fiber drawing step and at least a second thermal fiber drawing step, comprising:
after the first thermal fiber drawing step, arranging a plurality of multi-material fibers within a second outer cladding layer; and
performing a second thermal fiber drawing step on the arranged plurality of multi-material fibers.

19. The method of claim 17, wherein a maximum temperature during the thermal fiber drawing is less than a maximum temperature during the thermally treating.

20. The method of claim 17, wherein said first material comprises a chalcogenide glass and said second material comprises a thermoplastic polymer.

21. The method of claim 20, further comprising dissolving the thermoplastic polymer after thermally treating the fiber.

22. The method of claim 17, wherein the at least one core comprises two half cylinders each comprising a different material aligned with respect to one another to provide a cylindrical core.

23. The method of claim 22, wherein the two half cylinders comprise a first glass and a second glass, and wherein the plurality of core particles comprise spherical particles including a first hemisphere comprising the first glass and a second hemisphere comprising the second glass.

24. The method of claim 17, wherein the at least one fiber core comprises a plurality of fiber cores, and wherein thermally treating the fiber produces a three-dimensional distribution of fiber core particles embedded in the outer first cladding layer.

25. The method of claim 24, wherein the three dimensional distribution of fiber core particles includes periodicity providing a standard deviation of center-to-center particle spacing less than 15% of average center-to-center particle spacing in at least a first and a second dimension transverse to a longitudinal-axis of the extended multi-material fiber.

* * * * *